United States Patent Office 2,816,093
Patented Dec. 10, 1957

2,816,093

MIXED ADHESIVE COMPOSITIONS INCLUDING α-CYANOACRYLATE ESTERS

Harry W. Coover, Jr., Kingsport, Tenn., assignor to Eastman Kodak Company, Rochester, N. Y., a corporation of New Jersey No Drawing. Application June 2, 1954,
Serial No. 434,077

3 Claims. (Cl. 260—78.5)

This invention relates to modified α-cyanoacrylate adhesive compositions and is particularly concerned with α-cyanoacrylate compositions containing up to 50% of a polymerizable neutral vinyl monomer admixed with monomeric α-cyanoacrylate ester.

The α-cyanoacrylate esters of the formula $$CH_2=C-COOR$$
$$|$$
$$CN$$

in which R is an alkyl group of 1–16 carbon atoms, a cyclohexyl group or a phenyl group, when applied in monomeric form on a surface to be bonded, set up rapidly to give a high strength adhesive bond between a great variety of materials. This characteristic of the α-cyanoacrylate monomer is in contrast to the behavior of most polymerizable monomers which cannot be used directly for adhesive applications. One of the few types of monomers other than the α-cyanoacrylate esters, which has been used for forming adhesive bonds, is the methacrylate ester type monomer. These materials, however, suffer the disadvantage that the adhesive sets up only after a prolonged period of time, whereby the article being bonded must be clamped or otherwise held in position for a prolonged period of time before the bond has set sufficiently to maintain the elements in position. This is a serious disadvantage in attempting to employ such materials in production operations since it entails an undesirably large expenditure for clamping means and also requires space in which to allow the articles being bonded to set up.

It is accordingly an object of this invention to provide a new and improved class of mixed monomer adhesive compositions consisting predominantly of α-cyanoacrylate monomer together with minor amounts of another polymerizable monomer to give adhesive compositions capable of rapidly forming adhesive bonds which require no clamping or supporting after a few seconds or a few minutes at most.

Another object of the invention is to provide monomer mixtures which form high strength adhesive bonds in a short period of time between a variety of materials, and which thereafter continue to set up upon standing without the necessity of further clamping or supporting.

A further object of the invention is to provide adhesive compositions which form bonds having an exceptionally high heat distortion temperature.

Another object of the invention is to increase the availability of α-cyanoacrylate adhesive compositions at lower prices by including in the composition more readily available monomeric materials which do not adversely affect the adhesive characteristics of the composition.

Other objects will be apparent from the description and claims which follow.

The adhesive compositions of this invention comprise a mixture of 50–99% by weight of monomeric α-cyanoacrylate ester as defined above and 1–50% by weight of a polymerizable neutral ethylenic monomer other than an α-cyanoacrylate ester. This invention is predicated on the unexpected discovery that neutral ethylenic monomers can be included with α-cyanoacrylate monomers in amounts up to equal the amount of the α-cyanoacrylate monomer without adversely affecting the adhesive characteristics of the α-cyanoacrylate monomer, despite the fact that many of such neutral ethylenic monomers are themselves of little or no use as adhesives. In the preferred embodiment of the invention, the neutral ethylenic monomer includes from about 1 to about 15% by weight based on the total monomer weight of a monomer such as allylmethacrylate or divinylbenzene, whereby a composition having an exceptionally high heat distortion temperature in the adhesive bonds is obtained. The adhesive compositions of this invention can be applied directly to the surface to be bonded and begin to set up almost immediately without the use of either heat or pressure. Within a very short time, the bond is sufficiently strong to permit the article to be moved and further clamping or supporting is not required. The article can thus be set aside to allow the bonding action to be completed. This is in contrast to the bonding practice in the past using partially polymerized ethyl methacrylate where the partially polymerized acrylate ester was applied and then subjected to a heating or curing operation to complete the polymerization and bond formation.

The α-cyanoacrylate monomers employed in practicing this invention can be prepared in any desired manner. They are usually prepared by reacting a suitable α-cyanoacetate ester or mixture of α-cyanoacetate esters with formaldehyde in the presence of a basic condensation catalyst to form a low molecular weight α-cyanoacrylate polymer which is thereafter depolymerized by heating under reduced pressure in the presence of an acidic polymerization inhibitor. Suitable α-cyanoacrylate monomers and their preparation is described in the copending application of Coover and Shearer, Serial No. 318,325, filed November 1, 1952. A particularly advantageous method for preparing such α-cyanoacrylate monomers in nonaqueous medium is described in the copending application of Joyner and Hawkins, Serial No. 415,422, filed March 10, 1954. Any of the α-cyanoacrylate monomers as defined herein can be used alone or in mixture of two or more of such monomers in practicing the invention. The lower alkyl α-cyanoacrylate esters are preferably employed due to their rapid bonding action and the ease of preparation of such monomers from readily available starting materials. Thus the methyl, ethyl, isopropyl, and butyl or isobutyl α-cyanoacrylate esters are desirably employed, although the cyclohexyl, phenyl, capryl, octyl or other monomeric α-cyanoacrylate esters can be used if desired.

The adhesive compositions of the invention include 1–50% by weight based on the total monomer weight of one or more polymerizable neutral ethylenic monomers other than the α-cyanoacrylate monomer. This neutral monomer can be a polymerizable vinyl hydrocarbon or a neutral ethylenic ester. The acrylate and methacrylate esters wherein the ester group contains from 1 to 4 carbon atoms are preferably employed in practicing the invention. Although the vinyl esters such as vinyl acetate, vinyl butyrate, or the like can be successfully employed, as well as the vinyl aryl hydrocarbon such as styrene, divinylbenzene, the acrylonitrile and methacrylonitrile monomers, and similar neutral monomers can also be employed. When the neutral monomer includes from about 1 to about 15% by weight based on the total monomer weight of a difunctional neutral monomer such as an allyl ester of a vinylic acid or a divinyl substituted monomer, the adhesive composition undergoes a degree of crosslinking during the bonding action whereby an exceptionally high heat distortion temperature for the adhesive bond is obtained. Thus, for example, the inclusion of 1–15% by weight of allylacrylate, allylmethacrylate, or divinylbenzene in the adhesive composition results in adhesive bonds having melting points higher than 200° C. as contrasted to a melting point of 165° C. for a methyl cyanoacrylate homopolymer. This is particularly useful when the bonded article is to be subjected to high temperatures during normal use. In practicing the invention, such neutral monomers as methyl acrylate, ethyl acrylate, isopropyl acrylate, butyl acrylate, isobutyl acrylate, methyl methacrylate, ethyl methacrylate, butyl methacrylate, acrylonitrile, methacrylonitrile, styrene, methyl styrene, vinyl acetate, vinyl butyrate, and the like are suitable for use. The basic monomers such as vinyl pyridine are unsuitable for use since they produce unstable mixtures which undergo rapid polymerization upon addition of the basic monomer to the α-cyanoacrylate ester. Acidic monomers such as ethylenic sulfonic acid cause excessive stabilization of the mixture against polymerization and prevent adhesive action.

The setting up of the adhesive compositions of this invention, and particularly the further bonding following the initial bonding is promoted by including a small amount of a peroxy catalyst in the adhesive composition just prior to use. Any of the well known per-catalysts such as the peroxides, persulfates, or perborates, and the like, can be used for promoting the complete polymerization of the composition. The amount of catalyst can, of course, be varied but amounts of about 0.1% by weight are usually suitable.

The adhesive compositions of the invention are stabilized against polymerization during storage by inclusion therein of from about 0.001% to about 2% by weight of a suitable acidic polymerization inhibitor, and desirably from 0.001 to about 0.01% by weight based on the monomer weight. This stabilizer is desirably sulfur dioxide, although other gaseous inhibitors having an acidic nature such as nitric oxide, hydrogen fluoride, boron trifluoride, and the like can be used. When the gaseous stabilizer is included in amounts of more than 0.01%, it is sometimes desirable to remove a portion of the stabilizer prior to use of the adhesive composition. This is readily done by subjecting the composition to a reduced pressure of about 1 mm. for a few minutes. The adhesive compositions can also include from about 0.001 to about 0.01% by weight of a neutral free radical inhibitor such as hydroquinone, trinitrobenzene, or t-butylcatechol in combination with the acidic inhibitor. Such added stabilizers give a high degree of stability in bulk to the adhesive compositions during storage. In the preferred range of stabilizer concentration, the adhesive composition undergoes autopolymerization in a few minutes when spread in a thin film on the surface to be bonded without the application of heat or pressure or the use of a polymerization catalyst. In some cases, it may be desirable to heat the article during the bonding operation in order to speed up the bonding action. In some cases, it may be desirable to further accelerate the bonding action by the application of very small amounts of bases such as ammonia, piperidine, pyridine, or the like to the article prior to bonding. The use of such basic catalysts tends to give weak bonds, however, and it is preferred to merely moisten the surface with an aliphatic alcohol such as methanol, ethanol, isobutanol, capryl alcohol, or the like prior to application of the adhesive composition thereto. This use of alcohol is of particular advantage in the bonding of materials exhibiting an acidic surface character, such as green wood or phenolic resins, or when using adhesive compositions containing relatively large amounts of stabilizer which slow the adhesive action.

The adhesive compositions can be used in the form of a mixture of the monomer alone, or it can include as much as 25% by weight of a viscosity regulator such as polymeric α-cyanoacrylate, polyacrylate, polymethacrylate or a cellulose ester, or up to about 20% by weight of a plasticizer such as a monofunctional aliphatic ester, a difunctional aliphatic or aromatic ester, a phosphate ester, a phosphonate ester, or the like.

Although the compositions of this invention can contain up to 50% by weight based on the total weight of monomer of a neutral monomer or monomers other than the α-cyanoacrylate monomer or monomers, the composition begins to bond rapidly as is characteristic of α-cyanoacrylate adhesive compositions containing no other added monomer. Once the bonding action has started, a high strength bond forms in a very short time, and the further bonding then proceeds at room temperature until the bond has become completely polymerized. The additional vinyl monomer does not adversely affect the strength of the adhesive bond thereby obtained. In this way, the available supply of α-cyanoacrylate monomers is greatly extended, and compositions of increased utility are readily prepared.

The invention is illustrated by the following examples, but it will be understood that the examples are included for purposes of illustration and are not intended to limit the scope of the invention unless otherwise specifically indicated.

*Example 1*

A mixture of 10 parts by weight of methyl acrylate with 90 parts by weight of methyl α-cyanoacrylate, both in monomeric form, and containing 0.1% by weight of acetyl peroxide, was employed for bonding together a variety of objects made of glass, metal, plastics and wood. The methyl α-cyanoacrylate polymerized rapidly to set the pieces being bonded to the extent that the article could be moved within a few minutes without disturbing the bond. During this period, the methyl acrylate remained in monomeric form. Over a period of hours, however, the methyl acrylate also polymerized to complete the formation of a very strong bond. No heat was required at any stage of the bonding operation.

*Example 2*

As has been described, the adhesive composition can contain equal parts by weight of α-cyanoacrylate monomer and other neutral vinyl monomers with excellent results. Thus a mixture of 50 parts by weight of methyl methacrylate monomer with 50 parts by weight of ethyl α-cyanoacrylate monomer containing 0.1% by weight of acetyl peroxide was employed for bonding a variety of glass, metal, plastic, and wood articles. The bond formed rapidly, and the bonding action was completed at 35° C.

*Example 3*

Similar results were obtained using an adhesive composition comprising a mixture of 20 parts by weight of ethyl acrylate and 80 parts by weight of methyl α-cyanoacrylate, the mixture containing 0.05% by weight of acetyl peroxide.

*Example 4*

Although the use of a perovide catalyst is preferred to promote the polymerization of the non-cyanoacrylate monomer, such catalyst not necessary for successful bonding. Thus the procedure set out in Example 1 was followed using an adhesive composition comprising 10 parts by weight of methyl acrylate and 90 parts by weight of methyl α-cyanoacrylate. No peroxide catalyst was used in this composition. The methyl α-cyanoacrylate polymerized rapidly to set the bond as before. Then, over a period of several days, the methyl acrylate polymerized to complete the formation of a high strength bond.

*Example 5*

A variety of objects were bonded using an adhesive composition containing 5 parts by weight of allyl acrylate, 10 parts by weight of methyl acrylate, 85 parts by weight of methyl α-cyanoacrylate and 0.05% of acetyl peroxide. The bond formation was very rapid, and the articles could be moved within a few minutes. After the bonded articles had been allowed to stand at room temperature for 24 hours, the heat resistance of glass to rubber and wood to wood bonds was tested. The bonds retained their strength at temperatures at high as 205° C.

*Example 6*

Other difunctional neutral monomers act in similar fashion to crosslink the adhesive composition during bonding to give equally heat-resistant bonds. Thus the procedure of Example 5 was repeated using 10 parts by weight of divinylbenzene instead of the allyl acrylate. As before, the adhesive bonds thereby obtained remained strong at temperatures above 200° C.

*Example 7*

Although the acrylate and methacrylate esters are preferred for use as the neutral vinyl monomer because of their ready availability, other neutral vinyl monomers can be employed with equally good results. For example, the procedure of Example 1 was folowed using an adhesive composition comprising 5 parts by weight of methyl acrylate, 5 parts by weight of styrene, 90 parts by weight of ethyl cyanoacrylate, and 0.01% by weight of acetyl peroxide. The bonds thereby obtained had a high degree of tensile strength.

*Example 8*

Similarly advantageous results were obtained using an adhesive composition comprising 5 parts by weight of acrylonitrile and 95 parts by weight of isobutyl α-cyanoacrylate. The bonding was promoted by incorporating 0.02% of acetyl peroxide into the composiiton just prior to the bonding.

The neutral monomers which are included within the scope of this invention are those which do not polymerize concomitantly with the α-cyanoacrylate monomers but which polymerize following the initial bonding. Thus the neutral vinyl monomers are those which are normally non-autopolymerizable, that is, which do not begin to polymerize within a few seconds or a few minutes when spread in a thin film. This is in contrast to mixtures of α-cyanoacrylate monomers in which the monomers often polymerize at different rates but which begin to autopolymerize almost at once. The adhesive action of the compositions of this invention is thus a two stage process and the compositions can be designated as two-stage adhesives as contrasted to a single-stage adhesive wherein all of the monomeric components enter into the initial bonding action.

Thus by means of this invention adhesive compositions are provided which have a rapid bonding action initially, and which continue to set up after the initial bonding to give adhesive bonds of exceptional strength between a variety of materials. Unlike the usual polymerizable adhesive compositions, no heating or curing operation is necessary, and the articles being bonded need not be clamped or supported during the setting up of the adhesive bond.

Although the invention has been described in considerable detail with particular reference to certain preferred embodiments thereof, variations and modifications can be effected within the spirit and scope of the invention as described hereinabove and as defined in the appended claims.

I claim:

1. An adhesive composition comprising a mixture of at least 50% by weight of monomeric alkyl α-cyanoacrylate wherein the alkyl group contains 1–4 carbon atoms, 1–15% by weight of a member of the group consisting of allyl acrylate and divinyl benzene, and 1–49% by weight of alkyl acrylate wherein the alkyl group contains 1–4 carbon atoms.

2. An adhesive composition comprising a monomeric mixture of at least 50% by weight of methyl α-cyanoacrylate, 1–15% by weight of allyl acrylate and 1–49% by weight of methyl acrylate.

3. An adhesive composition comprising a monomeric mixture of at least 50% by weight of methyl α-cyanoacrylate, 1–15% by weight of divinyl benzene and 1–49% by weight of methyl acrylate.

References Cited in the file of this patent
UNITED STATES PATENTS

| | | |
|---|---|---|
| 2,437,231 | Mowry | Mar. 2, 1948 |
| 2,439,081 | Dickey et al. | Apr. 6, 1948 |
| 2,467,927 | Ardis | Apr. 19, 1949 |
| 2,615,879 | Folt et al. | Oct. 28, 1952 |